May 27, 1969 B. J. BROSE 3,446,410
IDLER SPOOL ASSEMBLY FOR USE IN DEVELOPING
PHOTOGRAPHIC FILM BY VISCOUS DEVELOPER
Filed March 3, 1967
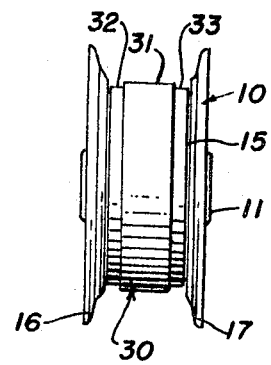
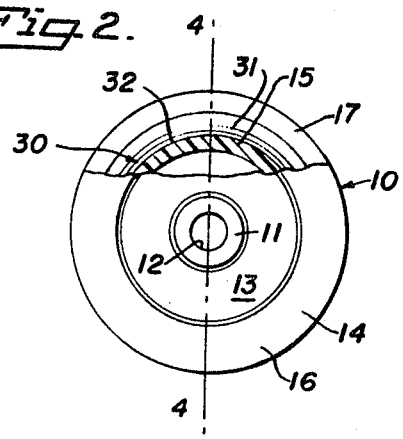
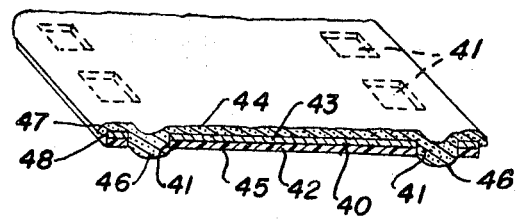
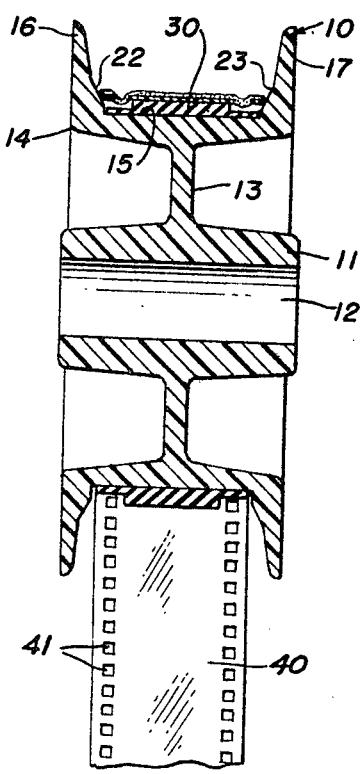
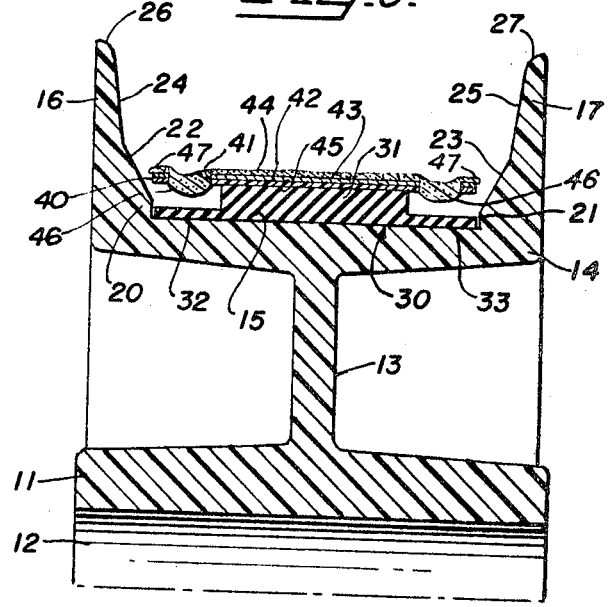
INVENTOR
BARRY J. BROSE
BY
Owen, Wickersham & Erickson
ATTORNEYS

United States Patent Office 3,446,410
Patented May 27, 1969

3,446,410
IDLER SPOOL ASSEMBLY FOR USE IN DEVELOPING PHOTOGRAPHIC FILM BY VISCOUS DEVELOPER
Barry J. Brose, 429 Jerome Ave.,
Piedmont, Calif. 94611
Filed Mar. 3, 1967, Ser. No. 620,546
Int. Cl. B65h 17/20
U.S. Cl. 226—191         4 Claims

ABSTRACT OF THE DISCLOSURE

An idler spool assembly is provided for use in developing, by viscous developer, photographic film having sprocket openings adjacent at least one side edge. The spool proper has a hub and a film-guiding channel defined by two side walls and a cylindrical wall, and each side wall includes a radial portion meeting the cylindrical wall and a frustoconical portion diverging outwardly from the radial portion by an angle of about thirty degrees. Around the cylindrical wall is a rubber tire having a thick portion and a thin marginal portion for each line of sprocket openings. The tire is sufficiently thick to hold the film at the radial distance from the cylindrical wall of the two diverging frustoconical portions and is sufficiently thicker than the thin marginal portions so that viscous developer on the film that lies in the sprocket openings and is held from falling by its normal retention characteristics, does not engage said tire.

---

This invention relates to an improved idler spool for use in developing long rolls of photographic film, such as motion picture film, by methods employing viscous developers.

Viscous developers have come on the market within the past few years. In contrast with developing systems calling for dilute solutions and constant agitation, a pastelike developer is spread on the emulsion of the film and, in continuous processes, the film is carried along from idler spool to idler spool in a compact apparatus with a long total path, the viscous developer remaining on the emulsion for a predetermined time and then being washed off. The viscous-developer process has many benefits in obtaining precision development of color film, but it has also given rise to some problems. Although viscous, the developer does tend to flow, and during the time when the film is passing over a large number of idler spools, the developer tends to flow to the extent that some of it extends beyond the edges of the film or drops through sprocket holes in the film, comes into contact with the idler spools, and comes off on the spool itself. Then it tends to be spread, to get onto the wrong side of the film, to cause streaks, and to harden and cause abrasion. The emulsion of the film also tends to swell during the viscous-developer process, and also tends to come off on conventional idler spools.

The present invention solves problems connected with the use of viscous developers by providing a novel combination of a new shape of idler spool and a specially shaped soft rubber tire covering the cylindrical surface of the spool and on which the film rides. The new spool structure solves the problem resulting from the flow of the viscous developer over the side edges of the film. In this invention, a critical portion of the generally vertical inner side walls of the spool flares outwardly at an angle of about thirty degrees from vertical instead of the usual eight or nine degrees; and it has been found that this structure provides sufficient clearance from the film to prevent developer which does overflow the edges of the film from coming into contact with the side walls of the spool, and, as a result, the viscous developer is carried along with the film until it is finally washed therefrom.

Idler spools used in the development process are typically made of nylon or phenol-formaldehyde, though they may be made of other materials which will stand the environment; even certain metals. Being necessarily rigid, the spools are liable to abrade and scratch the film. Nylon, for example is quite slick, but its very slickness means that the film tends to slip on it, and slippage results in abrasion; and if there are any rough surfaces whatever, the abrasion results in scratching the film. Rough surfaces may be formed by dried developer or by minor irregularities in the material of the spool itself.

The invention solves this problem by combining with the idler spool the novel rubber tire having a raised central portion somewhat narrower than the distance between the film sprockets. The raised portion raises the film to a height opposite the thirty degree slope portion of the spool wall and also provides a soft yielding cushion that both reduces scratching by its softness and resiliency and by affording a good driving contact with the film, so that there is no slippage leading to abrasion. The raised central portion is bordered on both sides by thin portions, resulting in a recess on each side of the central portion, and this recess provides space into which viscous film can hang down through the sprocket holes at the edges of the film without actually coming into contact with the tire or with the spool.

The invention also includes certain proportions which are critical for the best results. In general, it may be said that the raised portion of the rubber tire is sufficiently high to provide a recess on each side into which the viscous developer can flow and hang down from the sprocket holes an amount within its usual limits of behavior without touching anything. The raised portion is enough narrower than the film width between sprocket holes so that such pendent developer does not touch it. The width of the complete tire should be only slightly less than the distance between the spool side walls between which it fits, so that the tire is positively located and so is the central raised portion. The 30-degree angle portion of the spool side wall is located where it is on the level where the film rides.

Other objects and advantages of the invention will appear from the following description of a preferred embodiment, which as an example, is for use in developing sixteen-millimeter film.

In the drawings:

FIG. 1 is a view in end elevation of an idler spool assembly embodying the principles of the invention.

FIG. 2 is a view in side elevation and partly in section, of the spool of FIG. 1, the upper portion of one side wall being cut away and the cylindrical portion being shown in section.

FIG. 3 is an enlarged fragmentary view in perspective and partly in section of a portion of film coated with viscous developer.

FIG. 4 is an enlarged view in section taken along the line 4—4 in FIG. 2 showing the spool in use with film on it.

FIG. 5 is a further enlarged fragmentary view of the upper portion of FIG. 4.

A spool 10 of this invention may be of nylon, phenol-formaldehyde, other rigid plastic, metal, or any material which will withstand the conditions to which it is submitted, namely, an environment involving viscous developer and the materials used to wash off the viscous developer. The spool 10 is provided with a hub 11 having a central opening 12 extending through it and adapted to ride on a shaft, preferably being mounted for free rotation. The hub 11, if made of nylon may act as a sleeve bearing, or the hub may be mounted on a ball bearing. The hub 11 extends the full width of the spool 10, is generally cylindrical, and is joined to a radially outwardly extending web 13, which supports at its radially outer periphery a circular channel 14 having a cylindrical wall 15 between two side walls 16 and 17.

Each side wall 16 and 17 meets the cylindrical wall 15 a short radial portion 20, 21 (see FIG. 5). Each radial portion 20, 21 leads outwardly to a very important frustoconical portion 22, 23, which extends at approximately thirty degrees thereto. While thirty degrees is an approximate figure, the best results are obtained close to that amount. If the angle is as low as twenty degrees, for example, viscous developer tends to flow into contact with the spool walls 16 and 17 and the intended result is not obtained. If the angle were to be much greater than thirty degrees, the spool would have to be much wider, and this involves significant additional expense, because then not as many spools can be placed on a given shaft in a developer cabinet, and the total size of the machine may have to be greatly enlarged. At its outer extremity, each frustoconical portion 22, 23 meets a flared or inclined portion 24, 25 which may be made at generally the normal inclination of developer spool walls, namely, about eight or nine degrees, and the proportions 24, 25 lead to rounded outer edges 26 and 27.

In developing apparatus using these spools 10, usually there will be many spools, several score or even several hundred in some apparatus, mounted rotatably on shafts, and the film in going from one to the other, enters and leaves at a slight angle each time, corresponding to a general helical path. It does not come straight on to the film; if it did so, the angle of the frustoconical portion could be reduced to about 20 degrees, but since the film actually enters and leaves at an angle each time, this must be taken into account, and that is the reason why I have found that about thirty degrees is the angle to use.

A novel rubber tire 30 rides on the cylindrical portion 15 and supports the film 40. The tire 30 has a central thickened portion 31 and two much thinner side portions 32 and 33. The tire 30 is slightly narrower than the distance between the two radial walls 20 and 21, only enough narrower to allow for manufacturing tolerances. The closer it is to the right size, the better, so long as it does not exceed the distance between the walls 20 and 21 and therefore ride up on them. Being close to and only slightly less than that distance positively locates the center raised portion 31, and it cannot drift under any of the sprocket openings 41 through the film 40, even if the film shifts slightly. Preferably, the tire 30 is made of a silicone rubber, which is soft and can well withstand the difficult chemical conditions to which it is exposed in this developing process. The tire 30 may be made of ordinary rubber latex, but this does not last as long and does not give quite as satisfactory results.

The film 40 comprises a base 42 and an emulsion 43 on top of which viscous developer 44 is placed. The shiny (non-emulsion) side 45 rides on the tire 30. After being dispersed on top of the emulsion 43, the developer 44 tends to sag through the sprocket openings 41 forming pendant portions 46 and also to have bulges 47 at the edges, where emulsion swell also produces portions 48.

The central thickened portion 31 of the tire 30 holds the film 40 slightly beyond the end of the radial portions 20 and 21, and, by holding it there, provides it with the desired spacing from the side wall portions 22 and 23 opposite those frustoconical walls. As a result, at any portion of the wall 22, 23 is diverging from the film 40 by thirty degrees plus whatever distance there may be, and even if the film 40 comes into contact with the wall 22 at one side, the thirty degrees is enough, when taken with the thickness of the film base 42, to prevent contact between the spool wall 22 and either the viscous developer 44 or the swollen film emulsion 43. Thus, the film 40 rides over the tire 30, being supported by the shiny side 45, while its emulsion 43 is on the opposite side, carrying the viscous developer 44 in a very thin film, and where the viscous developer 44 flows over the edges to form the bulges 47 it is prevented from coming into contact with the side walls by the divergence provided by this invention.

The viscous developer 44 cannot be kept from entering the film sprocket hole 41 and therefore hanging down slightly in the portions 46. It does not drop through, because it is viscous, and it does tend to hang down below the side 45, and the height of the tire's central portion 31 is sufficient so that the viscous developer portions 45 are not able to touch the lower side margin portions 32 and 33 of the tire 30.

For example, for 16 mm. film, which is about 0.63" wide, the width of the cylindrical portion 15 between the vertical portions 20 and 21 is preferably about 0.61" plus or minus about 0.005" and this vertical wall extends up about 0.05", plus or minus about 0.005" tolerance. The height of each frustoconical portion 22, 23 is about 0.061 inch at a 30-degree inclination with respect to vertical (60 degrees with respect to horizontal). The rubber tire 30 is between 0.600 and 0.610" wide, its thin portions 32 and 33 are about 0.035 to 0.045" thick and its thick portions 31 about 0.065 to 0.075" thick.

Thus, as the developing film 40 rides over the series of spools 10 during its development process, it is not apt to be scratched because it is in contact only with the central portion 31 of the tire 30, which is a soft material. The soft elastomer 30 engages and makes a good driving contact with the film 40 so that the film drives the spool 10 uniformly and does not slip around it, thereby reducing abrasion to a minimum, and the softness of the surface itself helps to reduce scratching.

By keeping the viscous developer 44 from getting on the spool 10 or tire 30, a further cause of abrasion is likewise eliminated, as well as streaking and other bad results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An idler spool assembly for use in developing, by viscous developer, photographic film having sprocket openings adjacent at least one side edge, including in combination:

a spool having a hub and a film-guiding channel defined by two side walls and a cylindrical wall, each said side wall including a radial portion meeting said cylindrical wall and a frustoconical portion diverging outwardly from the radial portion by an angle of about thirty degrees, and a rubber tire having a thick main portion and at least one narrow thin portion in alignment with the sprocket openings of said film, there being a thin portion for each line of sprocket openings, said tire snugly encircling said cylindrical wall and of a thickness sufficient to hold the film slightly beyond the end of the radial portions, said thick portion being sufficiently thicker than each thin portion so that viscous developer on said film that lies in said sprocket openings, being held from falling by its normal retention charasteristics, does not engage said tire.

2. An idler spool assembly for use in development by viscous developer of photographic film having a pair of lines of sprocket openings adjacent side edges, including in combination:

a spool having a hub and a film-guiding channel defined by a cylindrical wall between a pair of side walls, each said side wall including a radial portion where the side walls meet the cylindrical wall perpendicularly, a succeeding frustoconical portion diverging outwardly from said radial portion at an angle of about thirty degrees, said frustoconical portion merging into an outer less sharply diverging portion, and a rubber tire having a central thick portion between a pair of side marginal thin portions, said tire being only slightly narrower than the distance between said radial portions, said tire snugly encircling and supported by said cylindrical wall, said thick portion being slightly narrower than the distance between the lines of sprocket openings of the film to be developed and of a thickness sufficient to hold the film at a radially outward distance from said cylindrical wall within the radial distances encompassed by said diverging frustoconical portions, said thick portion being sufficiently thicker than said thin marginal portions so that viscous developer on said film and in said sprocket openings, held therein by its normal retention characteristics, does not engage said tire.

3. The spool assembly of claim 2 wherein said spool is nylon and said tire is a silicon rubber.

4. An idler spool assembly for use in developing photographic film by viscous developer, including in combination:

a spool having a hub and a film-guiding channel defined by two side walls and a cylindrical wall, each said side wall including an anner radial portion meeting said cylindrical wall, an inner frustoconical portion diverging outwardly from the radial portion by an angle of about thirty degrees, and an outer less sharply diverging portion, and a rubber tire snugly encircling said cylindrical wall and of a thickness sufficient to hold the film at the radial distance from said cylindrical wall of the two diverging inner frustoconical portions so that viscous developer on said film does not engage said spool side wall.

References Cited

UNITED STATES PATENTS

| | | | |
|---|---|---|---|
| 2,092,177 | 9/1937 | McClay | 242—76 X |
| 2,109,451 | 3/1938 | Loomis et al. | 242—76 X |
| 2,120,735 | 6/1938 | Debrie | 226—191 |
| 2,473,499 | 6/1949 | Liebel | 226—193 X |
| 2,608,876 | 9/1952 | Miller | 226—190 X |
| 2,925,168 | 2/1960 | Lorig | 198—202 |
| 3,253,758 | 5/1966 | Horiuchi | 226—193 X |
| 3,310,214 | 3/1967 | Nesin | 226—191 X |

ALLEN N. KNOWLES, *Primary Examiner.*

226—196